(12) United States Patent
Sato et al.

(10) Patent No.: US 8,392,967 B2
(45) Date of Patent: Mar. 5, 2013

(54) IMAGE FORMING SYSTEM, IMAGE FORMING APPARATUS, AND METHOD FOR CREATING, MAINTAINING, AND APPLYING AUTHORIZATION INFORMATION

(75) Inventors: Masafumi Sato, Osaka (JP); Takashi Oguma, Osaka (JP); Haruhisa Sumimoto, Osaka (JP); Toru Yasui, Osaka (JP)

(73) Assignee: KYOCERA Document Solutions Inc. (JP)

( * ) Notice: Subject to any disclaimer, the term of this patent is extended or adjusted under 35 U.S.C. 154(b) by 216 days.

(21) Appl. No.: 12/954,402

(22) Filed: Nov. 24, 2010

(65) Prior Publication Data

US 2011/0126270 A1    May 26, 2011

(30) Foreign Application Priority Data

| Nov. 26, 2009 | (JP) | ................................. | 2009-268573 |
| Nov. 26, 2009 | (JP) | ................................. | 2009-268574 |
| Nov. 26, 2009 | (JP) | ................................. | 2009-268577 |
| Mar. 16, 2010 | (JP) | ................................. | 2010-058737 |

(51) Int. Cl.
*H04L 9/32* (2006.01)
(52) U.S. Cl. ................................. 726/2; 726/3; 726/4
(58) Field of Classification Search .................. 726/1–7; 713/168–170
See application file for complete search history.

(56) References Cited

U.S. PATENT DOCUMENTS

| 6,584,568 B1 * | 6/2003 | Dircks et al. ....................... 726/2 |
| 7,562,232 B2 * | 7/2009 | Zuili et al. ..................... 713/194 |
| 7,725,924 B2 * | 5/2010 | Terao ................................. 726/2 |
| 2006/0059211 A1 | 3/2006 | Futatsugi |
| 2006/0256370 A1 | 11/2006 | Murakawa |
| 2009/0070864 A1 | 3/2009 | Nishida |
| 2009/0119755 A1 | 5/2009 | Kodimer et al. |
| 2009/0219567 A1 | 9/2009 | Ishizaki |

FOREIGN PATENT DOCUMENTS

| JP | 2002-324053 | 11/2002 |
| JP | 2006-079465 | 3/2006 |
| JP | 2006-319459 | 11/2006 |
| JP | 2006-331120 | 12/2006 |
| JP | 2006-338522 | 12/2006 |
| JP | 2008-140067 | 6/2008 |
| JP | 2008-244518 | 10/2008 |
| JP | 2009-071409 | 4/2009 |
| JP | 2009-140232 | 6/2009 |
| JP | 2009-212613 | 9/2009 |

* cited by examiner

*Primary Examiner* — Hosuk Song
(74) *Attorney, Agent, or Firm* — McDonnell Boehnen Hulbert & Berghoff LLP

(57) ABSTRACT

A user-manager server device includes: registration information on a local group including a domain user separately from a domain group managed by a directory server device, and authorization information on the domain group, the domain user, and/or the local group. When a logged-in user belongs to the local group, an authorization processing unit transmits the authorization information on the local group to a multifunction periphery (MFP) as the authorization information corresponding to the logged-in user. When the logged-in user does not belong to the local group, the authorization processing unit transmits the authorization information on one of the domain group and the domain user to the MFP as the authorization information corresponding to the logged-in user.

16 Claims, 14 Drawing Sheets

IMAGE FORMING SYSTEM, IMAGE FORMING APPARATUS, AND METHOD FOR CREATING, MAINTAINING, AND APPLYING AUTHORIZATION INFORMATION

INCORPORATION BY REFERENCE

This application is based upon and claims the benefit of priority from corresponding Japanese Patent Application Nos. 2009-268573, 2009-268574, and 2009-268577, all filed Nov. 26, 2009, and Japanese Patent Application No. 2010-058737, filed Mar. 16, 2010, the entire contents of each of which is incorporated herein by reference.

BACKGROUND

1. Field of the Invention

The present invention relates to an image forming system, an image forming apparatus and an image forming method.

2. Description of the Related Art

In recent years, directory services such as Active Directory and e-Directory have been introduced to manage users and devices in a networked system. Some image forming apparatuses such as a printer, a copier, and a multifunction peripheral (MFP) have a network function, which performs management of users and groups by the directory service. To perform the management of the users by the directory service, a user authentication for a user who has performed a login operation to the image forming apparatus is performed on the server device for the directory service.

On the image forming apparatus, an authorization process using only a function permitted to a logged-in user among various functions is performed. In the authorization process, authorization information specifying a function which is permitted or prohibited for use has been previously set on the image forming apparatus for each user, and some functions to be used by the logged-in user are limited by the authorization information.

In addition, there is a system providing the image forming apparatus with the authorization information corresponding to the logged-in user, by an intermediate server device including the authorization information for each user. In this system, the intermediate server device performs centralized management of the authorization information for each user, but it is difficult to flexibly set the authorization information on users and groups.

For example, in a case of setting the authorization information on a group different from a domain group in the directory service, the authorization information cannot be set collectively, and hence the authorization information must be set for each of a plurality of users belonging to the group. This makes work of setting the authorization information complicated. It is possible to additionally set the authorization information in the directory service on a group basis, but there is a fear that bad influence may be exerted upon the directory service that is already in operation in a company or the like.

SUMMARY

The present disclosure relates to an image forming system, an image forming apparatus, and an image forming method that may set authorization information flexibly for users and groups while centrally managing the authorization information.

An image forming system according to an aspect of the present disclosure includes an image forming apparatus, a directory server device, an authorization information registration device, and a user-manager server device that are connected to a network. The directory server device includes registration information data on one of a domain group and domain user. The authorization information registration device acquires list data based on the registration information data on the one of the domain group and domain user from the directory server device, determines information on the one of the domain group and domain user within the list data, and registers the determined authorization information to the user-manager server device in association with the one of the domain group and domain user as authorization information data. The user-manager server device transmits, to the image forming apparatus, the authorization information on a logged-in user to the image forming apparatus based on the authorization information data on the one of the domain group and domain user.

An image forming apparatus according to an aspect of the present disclosure includes: an input device that receives an input of authentication information corresponding to a logged-in user; a determination unit that specifies function(s) that are permitted or not permitted for use by the logged-in user among the functions that the image forming apparatus provides, based on authorization information, and stores data indicating whether or not the function(s) are permitted for use; and a control unit that causes the logged-in user to use only the function(s) that are permitted for use based on the data. The authentication information corresponding to the logged-in user is transmitted by a user-manager server device connected to a network from the image forming apparatus to a directory server device connected to the network. User information corresponding to the logged-in user is transmitted to the user-manager server device if the authentication information is determined to be valid by the directory server device. The authorization information corresponding to the user information corresponding to the logged-in user is specified and transmitted to the image forming apparatus from the user-manager server device.

An image forming method according to an aspect of the present disclosure includes: transmitting, by an image forming apparatus connected to a network, authentication information corresponding to a logged-in user to a user-manager server device connected to the network; transmitting, by the user-manager server device, the authentication information received from the image forming apparatus and an authentication request to a directory server device connected to the network; determining, by the directory server device, whether or not the authentication information received from the user-manager server device is valid, and if the authentication information is valid, transmitting user information corresponding to the logged-in user to the user-manager server device as a response to the authentication request; specifying, by the user-manager server device, authorization information corresponding to the logged-in user based on the user information corresponding to the logged-in user received from the directory server device, and transmitting the authorization information to the image forming apparatus; and setting, by the image forming apparatus, data indicating whether or not the logged-in user is permitted to use a function that the image forming apparatus provides based on the authorization information received from the user-manager server device, and referencing the set data to receive only a job that uses the function permitted to the logged-in user, and execute the job.

DETAILED DESCRIPTION

Figure 1:
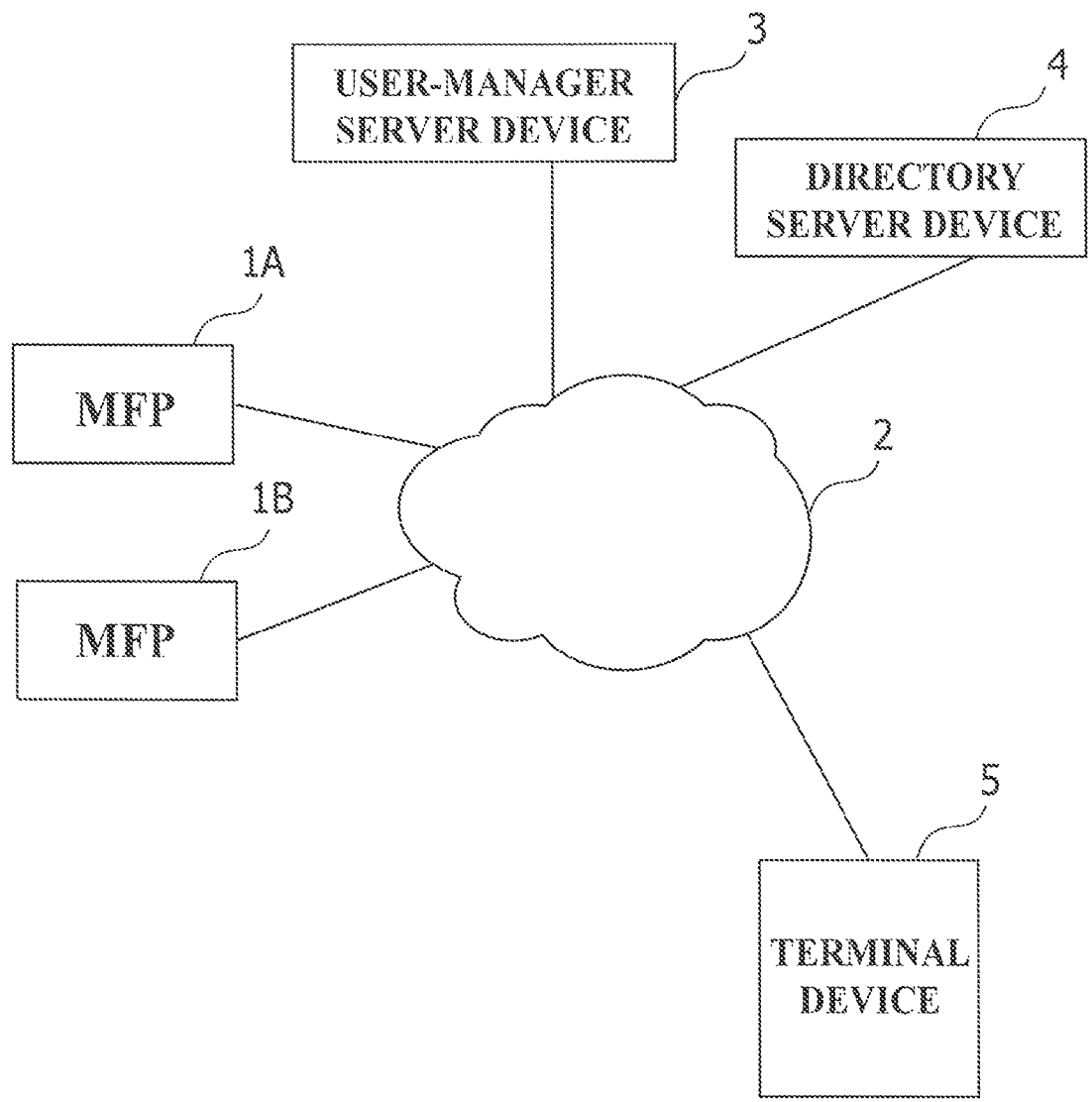
FIG. 1 is a block diagram illustrating a configuration of an image forming system according to an embodiment of the present disclosure.

FIG. 1 is a block diagram illustrating a configuration of an image forming system according to an embodiment of the present disclosure. A plurality of multifunction peripherals (MFPs) 1A and 1B are connected to a network 2. Further connected to the network 2 are a user-manager server device 3, a directory server device 4, and a terminal device 5 (an example of an authorization information registration device).

The MFP 1A is an image forming apparatus having a printer function, a scanner function, a copy function, a facsimile function, and the like, that uses those functions to execute various kinds of jobs responsive to receiving an instruction from an operation panel on the MFP 1A or from a host device (not illustrated) connected to the network 2. The MFP 1B is an image forming apparatus having a same or similar configuration.

The user-manager server device 3 receives a user authentication request from the MFPs 1A and 1B, and provides authorization information on a logged-in user to the MFPs 1A and 1B. The directory server device 4 provides a directory service such as Active Directory or e-Directory.

Figure 2:
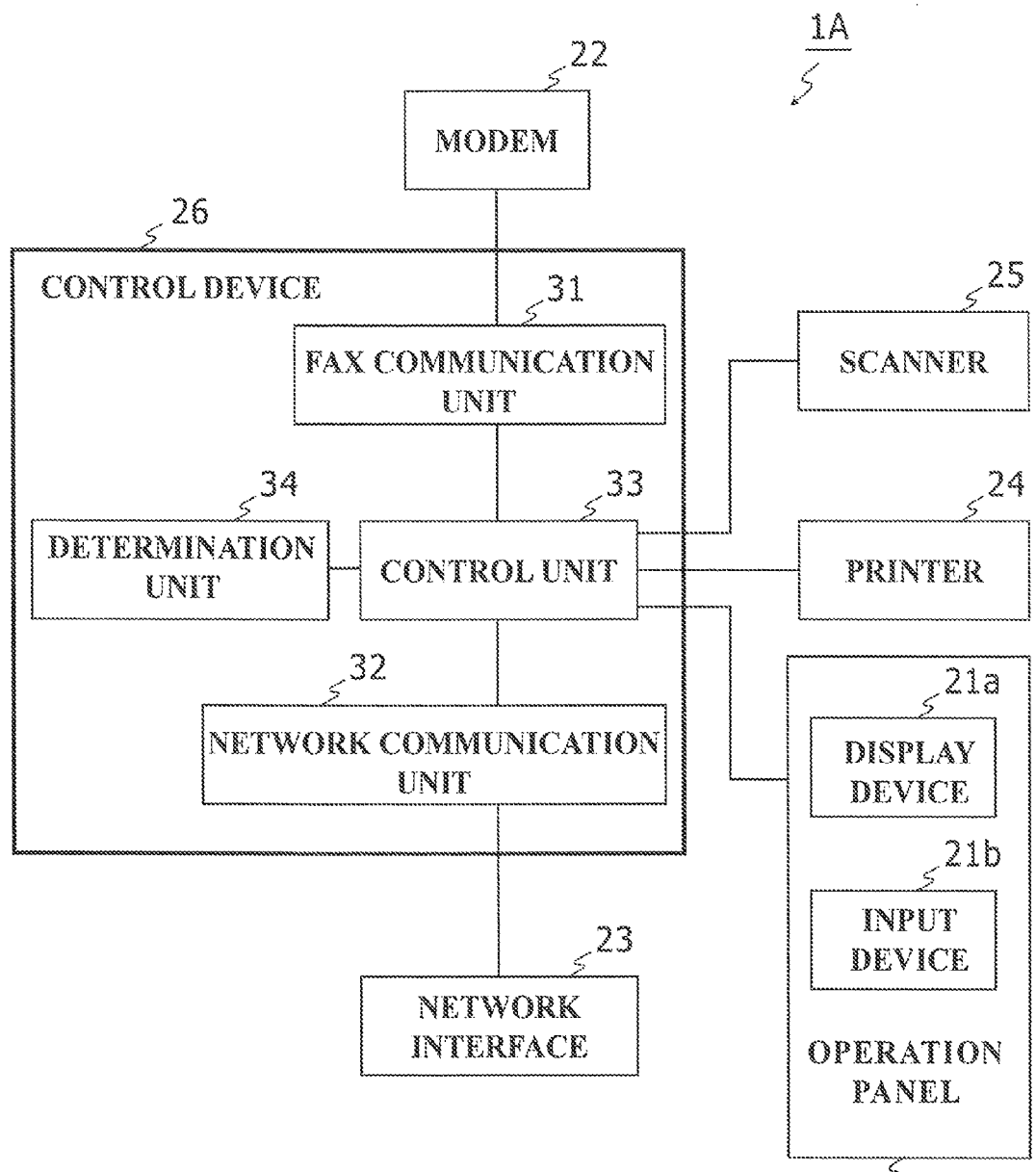
FIG. 2 is a block diagram illustrating a configuration of a multifunction peripheral (MFP)

FIG. 2 is a block diagram illustrating a configuration of the MFP 1A of FIG. 1. The MFP 1B includes a same or similar configuration. The MFP 1A includes an operation panel 21, a modem 22, a network interface 23, a printer 24, a scanner 25, and a control device 26.

The operation panel 21 is installed onto the MFP 1A, and includes a display device 21a that presents various kinds of information to the user and an input device 21b that receives a user operation. The display device 21a may include, for example, a liquid crystal display and various kinds of indicators. The input device 21b may include, for example, a touch panel and key switches.

The modem 22 is a communication device that is connected to a subscriber's telephone line network such as a public switched telephone network (PSTN) and performs transmission/reception of facsimile data.

The network interface 23 is connected to the computer network 2 in a wired and/or wireless manner, and performs data communications with other devices (for example, the user-manager server device 3 and the host device) connected to the network 2.

The printer 24 performs printing on a paper sheet by a print request and delivers a printed paper sheet. In an electro photographic process, by causing a light source to emit light based on printing data after charging a photoconductor drum, the printer 24 forms an electrostatic latent image on the photoconductor drum surface, develops the electrostatic latent image by toner, transfers a toner image onto the paper sheet, fixes the toner image, and delivers the printed paper sheet.

The scanner 25 applies light to one side surface or both side surfaces of a document fed from an automatic document feeder or a document placed by the user, receives reflected light, and outputs corresponding image data reflecting the document.

The control device 26 controls processing units of the MFP 1A and performs data process. The control device 26 is configured as a computer including, for example, a central processing unit (CPU), a read only memory (ROM), and a random access memory (RAM). On the control device 26, the CPU implements various kinds of processing units by loading a program stored in the ROM or other storage device (for example, a flash memory) into the RAM and executing the program. The control device 26 implements a FAX communication unit 31, a network communication unit 32, a control unit 33, and a determination unit 34.

The FAX communication unit 31 controls the modem 22 to receive the facsimile data. Upon reception of the facsimile data, the FAX communication unit 31 supplies the print request to the control unit 33.

The network communication unit 32 controls the network interface 23 to perform data communications with the devices on the network 2 using various kinds of communication protocols. For example, the network communication unit 32 transmits, to the user-manager server device 3, a user name (user ID) and a password input through the operation panel 21 upon user login, and receives the authorization information corresponding to the logged-in user from the user-manager server device 3. Further, the network communication unit 32 receives the print request for page description language (PDL) data or the like from the host device, and supplies the print request to the control unit 33.

The control unit 33 receives a job request in response to a user operation to the operation panel 21 or a job request received from the host device through the network interface 23 and the network communication unit 32, and controls the processing units within the MFP 1A to execute a job corresponding to the job request. Possible job requests include a print request, a scan request, and a facsimile transmission request. Further, when a login operation occurs, the control unit 33 causes the network communication unit 32 to request user authentication, authorization information, and the like from the user-manager server device 3.

Further, the control unit 33 generates job log information when a job is executed for the logged-in user who has succeeded in the user authentication, and transmits the job log information to the user-manager server device 3 in association with the logged-in user.

Based on the authorization information corresponding to the logged-in user received from the user-manager server device 3 through the network interface 23 and the network communication unit 32, the determination unit 34 specifies a function which is prohibited or permitted for use by the logged-in user from among the functions that the MFP 1A provides, and stores data indicating whether or not the use of each of the functions is permitted in RAM. The control unit 33 references the data to limit the use of the MFP 1A by the logged-in user. For example, when the use of a color copy function is limited for a particular logged-in user, a menu of the copy function may be displayed on the operation panel 21 so as to prevent the color copy function from being chosen by the particular logged-in user. For example, a button for choosing a color copy may be grayed out.

Figure 3:
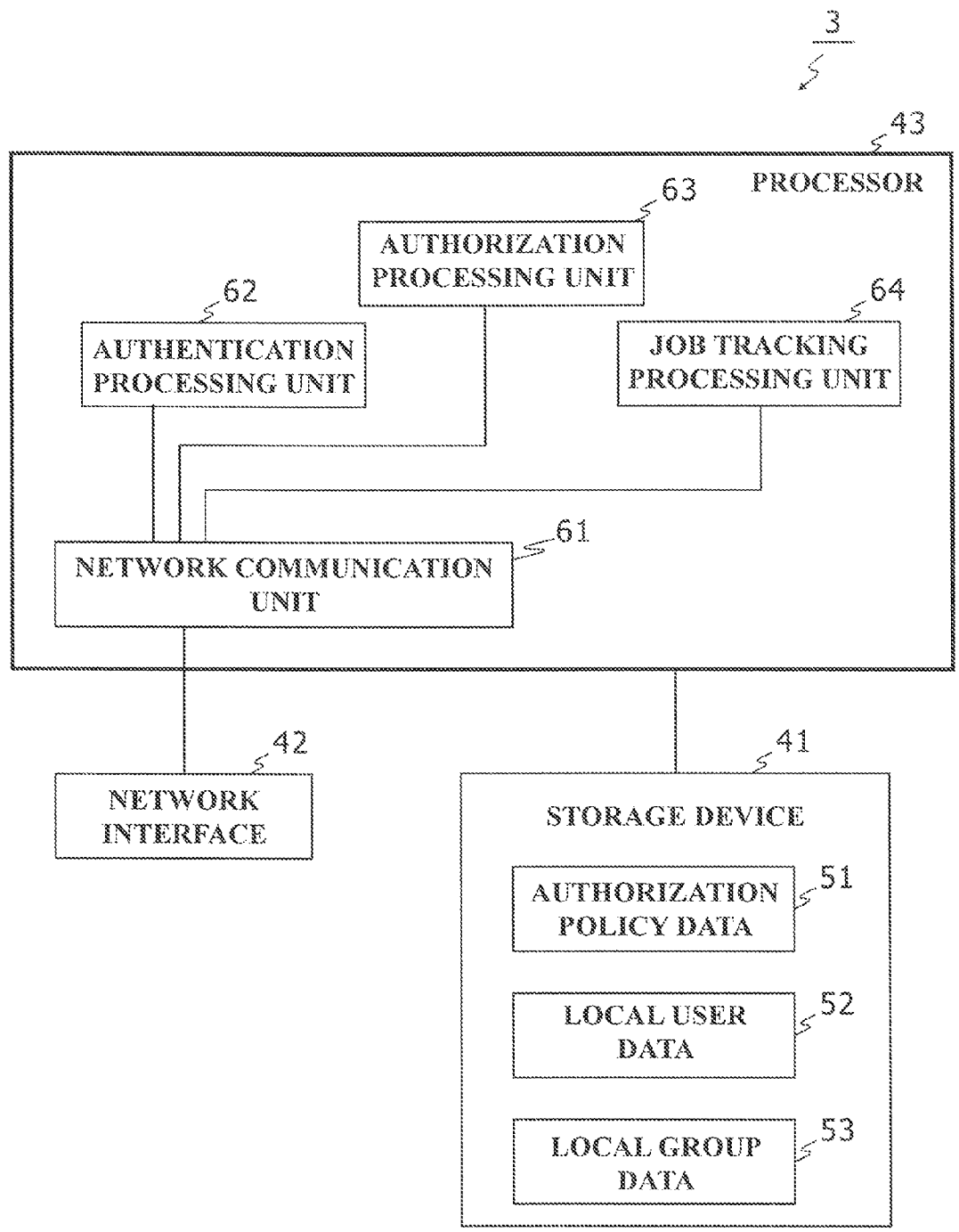
FIG. 3 is a block diagram illustrating a configuration of a user-manager server device.

FIG. 3 is a block diagram illustrating a configuration of the user-manager server device 3 of FIG. 1. The user-manager server device 3 includes a storage device 41, a network interface 42, and a processor 43.

The storage device 41 stores a program and data. The storage device 41 may include a nonvolatile semiconductor memory, a hard disk drive, or the like. The storage device 41 may store authorization policy data 51, local user data 52, and local group data 53.

The authorization policy data 51 includes authorization information data having the authorization information used for specifying the function which is permitted for use by the logged-in user at the MFPs 1A and/or 1B. The authorization policy data 51 includes the authorization information on a user and/or group basis. The authorization information on users may be applied to a user, and the authorization information on groups may be applied to a user belonging to a group. As the authorization information on users, the authorization policy data 51 includes the authorization information on domain users registered on the directory server device 4 and the authorization information on local users registered on the user-manager server device 3. As the authorization information on groups, the authorization policy data 51 includes the authorization information on domain groups registered on the directory server device 4 and the authorization information on local groups registered on the user-manager server device 3. The authorization information on users includes an ID of a user and information on a function (for example, an ID of the function) which is permitted or prohibited for use by the user. The authorization information on groups includes an ID of a group and information on a function (for example, an ID of the function) which is permitted or prohibited for use by a user belonging to the group. For example, the function which is permitted or prohibited for use may include upper-level functions such as printing, scanning, copying, facsimile transmission, and/or lower-level items (for example, a color/black choosing function) accompanying each of the upper-level items.

Figure 4:
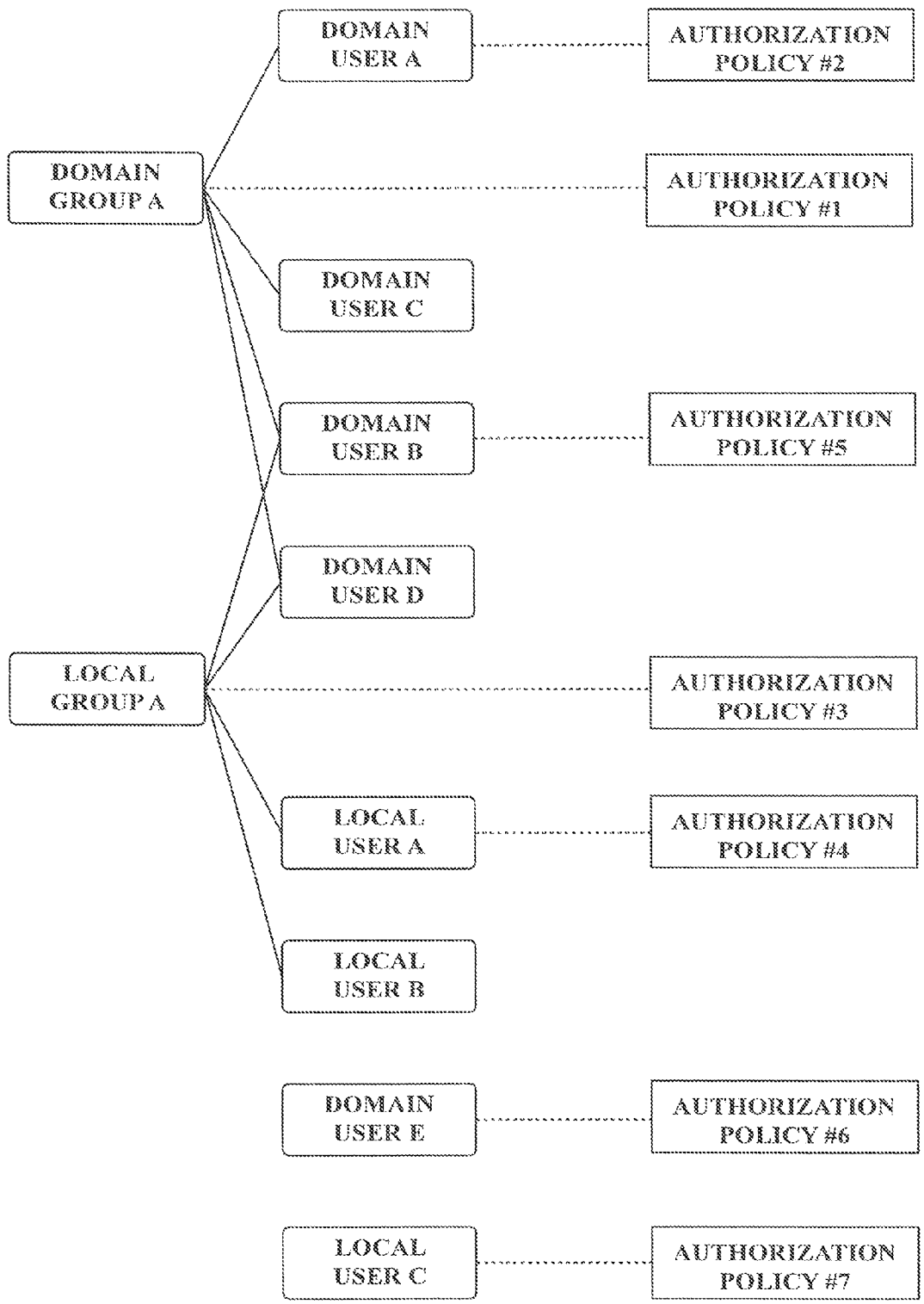
FIG. 4 is a diagram illustrating an example of authorization policy data.

FIG. 4 is a diagram illustrating a structural example of the authorization policy data 51 of FIG. 3.

As shown in FIG. 4, a domain group A includes domain users A, B, C, and D. A local group A includes local users A and B and domain users B and D. An authorization policy #1 (policy data including authorization information) is set for the domain group A. An authorization policy #2 is set for the domain user A belonging to the domain group A. An authorization policy #3 is set for the local group A. An authorization policy #4 is set for the local user A belonging to the local group A. An authorization policy #5 is set for the domain user B belonging to the domain group A. An authorization policy #6 is set for a domain user E. An authorization policy #7 is set for a local user C.

The local user data 52 is registration information data including the authentication information on local users (for example, the user ID and the password). The local user is registered on the user-manager server device 3 separately from the domain user registered on the directory server device 4.

The local group data 53 is registration information data including the authentication information on local groups (the group ID and the user IDs of the users belonging to the group). The local group is registered on the user-manager server device 3 separately from the domain group registered on the directory server device 4. The local group includes the local users and the domain users. In other words, the local group consisting of only the local users, the local group consisting of only the domain users, and the local group consisting of the local users and the domain users are set.

The network interface 42 is connected to the computer network 2 in a wired and/or wireless manner, and performs data communications with other devices (for example, MFPs 1A and 1B and directory server device 4) connected to the network 2.

The processor 43 is configured as a computer including a CPU, a ROM, and a RAM, and implements various kinds of processing units by loading a program stored in the ROM or the storage device 41 into the RAM and causing the CPU to execute the program. The processor 43 implements a network communication unit 61, a user authentication processing unit 62, an authorization processing unit 63, and a job tracking processing unit 64.

The network communication unit 61 controls the network interface 42 to perform data communications with the devices on the network 2 using various kinds of communication protocols. The network communication unit 61 may receive the user name (user ID) and the password from the MFP 1A, and transmit the authorization information on the user to the MFP 1A. The network communication unit 61 may also transmit the user authentication request to the directory server device 4, and receive an authentication result and user information from the directory server device 4.

The user authentication processing unit 62 uses the network interface 42 to cause the directory server device 4 to perform authentication of the logged-in users to the MFPs 1A and/or 1B.

When the logged-in user to the MFP 1A and/or the MFP 1B who has succeeded in the user authentication belongs to the local group, the authorization processing unit 63 extracts the authorization information on local groups from the authorization policy data 51, and transmits the authentication information as the authorization information corresponding to the logged-in user to the MFP 1A and/or the MFP 1B through the network interface 42. On the other hand, when the logged-in user who has succeeded in the user authentication does not belong to any local group, the authorization processing unit 63 extracts the authorization information on domain users or domain groups to which the logged-in user belongs from the authorization policy data 51, and transmits the authentication information as the authorization information corresponding to the logged-in user to the MFP 1A and/or the MFP 1B through the network interface 42.

For example, in the case of FIG. 4, when the domain user A logs in to the MFP 1A, the authorization policy #2 and the authorization policy #1 are transmitted to the MFP 1A. If a conflict occurs between the authorization information on the user and on the group (for example, authorization policy #2 and authorization policy #1), the predetermined authorization information on the groups or users is applied.

When the domain user B logs in to the MFP 1A, the authorization policy #5, the authorization policy #3, and the authorization policy #1 are transmitted to the MFP 1A. If a conflict occurs between the authorization information on domain groups and local groups (for example, authorization policy #1 and authorization policy #3), the predetermined authorization information on domain groups or local groups is applied.

When the domain user C logs in to the MFP 1A, the authorization policy #1 is transmitted to the MFP 1A. Further, when the domain user D logs in to the MFP 1A, the authorization policy #1 and the authorization policy #3 are transmitted to the MFP 1A.

When the domain user E logs in to the MFP 1A, the authorization policy #6 is transmitted to the MFP 1A.

When the local user A logs in to the MFP 1A, the authorization policy #4 and the authorization policy #3 are transmitted to the MFP 1A.

When the local user B logs in to the MFP 1A, the authorization policy #3 is transmitted to the MFP 1A.

When the local user C logs in to the MFP 1A, the authorization policy #7 is transmitted to the MFP 1A.

It should be noted that, when there is a plurality of authorization information corresponding to a logged-in user, the user-manager server device 3 may cause the authorization processing unit 63 to generate one authorization information by combining those authorization information and may transmit the generated authorization information. In this case, if a conflict occurs among the plurality of authorization information, one of the authorization information selected according to a predetermined rule is applied.

For example, when there are a plurality of authorization information to be applied to the logged-in user (for example, the authorization information on local groups and domain users, the authorization information on domain groups and local groups, or the authorization information on local users and local groups), the user-manager server device 3 causes the authorization processing unit 63 to generate one authorization information by combining those authorization information, and transmits the generated authorization information.

Further, it should be noted that, when there are a plurality of authorization information to be applied to the logged-in user, the authorization processing unit 63 may generate user-authorization information that permits the use of the function which is permitted for use by any one of those authorization information. In other words, the authorization processing unit 63 may generate user-authorization information that prohibits the use of the function which is prohibited for use by at least one of those authorization information.

The job tracking processing unit 64 receives the job log information from the MFPs 1A and 1B through the network interface 42, and sums up the job log information as a user job history for each of the domain users and the local users. When the local user is not set, the job log information is summed up as the user job history for each of the domain users. The job log information includes information generated in the MFPs 1A and/or 1B when the job is executed for the logged-in user who has succeeded in the user authentication, and includes the user ID of the logged-in user, a job type (printing, scanning, copying, facsimile transmission, and the like), attribute information (color, monochrome, double-sided printing, and the like), and a counter value of the number of pages (additional information) for each of the job type and/or each of the attribute information. For example, in FIG. 4, the user job history including the user ID for each of the domain users A to E and each of the local users A to C is summed up. Therefore, by causing the user job history to be viewed or transmitted to a predetermined address by electronic mail, file transfer protocol, or the like, it is possible to confirm what kind of jobs the user executed in the past.

Figure 5:
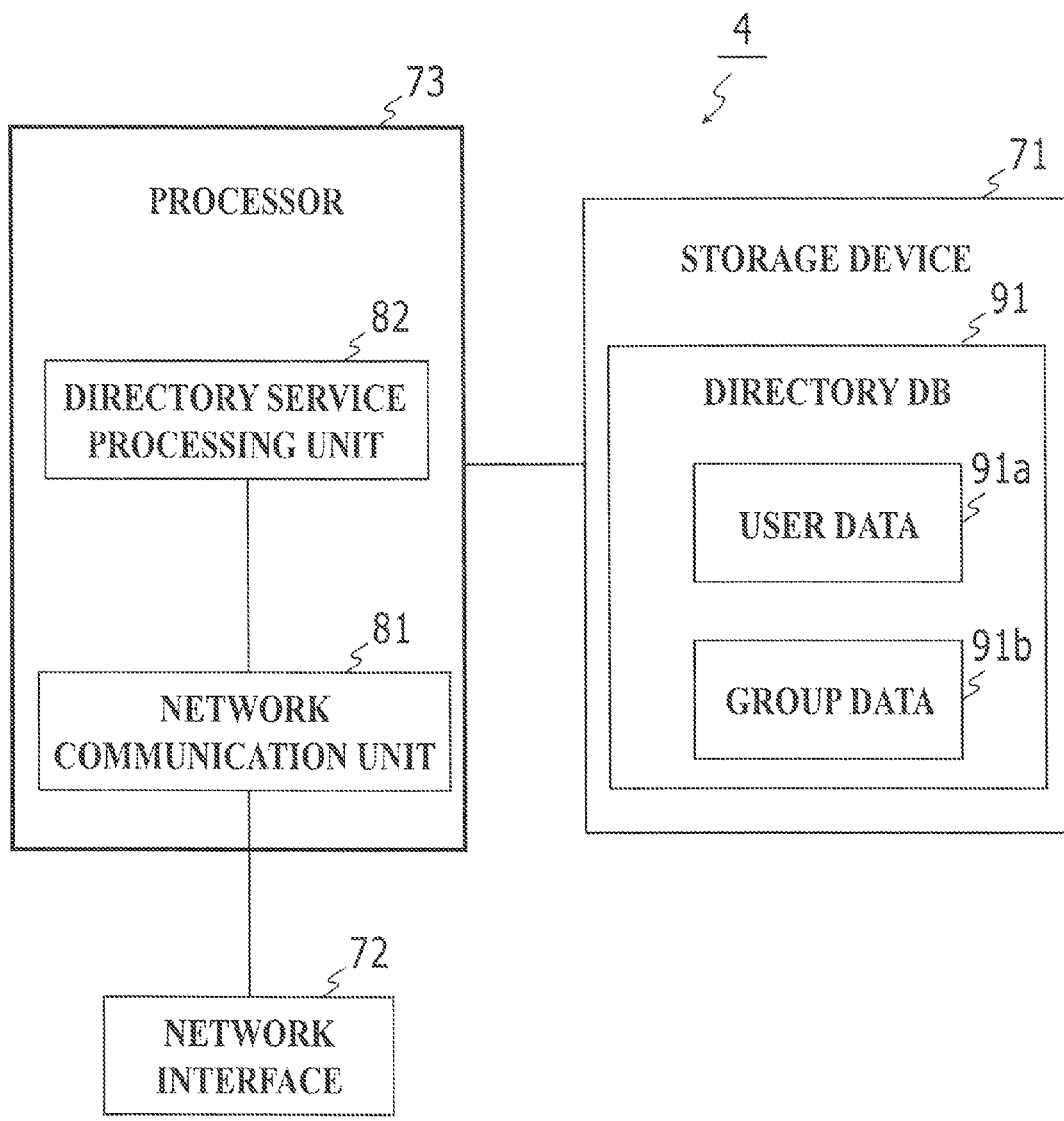
FIG. 5 is a block diagram illustrating a configuration of a directory server device.

FIG. 5 is a block diagram illustrating a configuration of the directory server device 4 of FIG. 1. The directory server device 4 includes a storage device 71, a network interface 72, and a processor 73.

The storage device 71 stores a program and data. The storage device 71 may be, for example, a nonvolatile semiconductor memory, a hard disk drive, or the like. A directory database (DB) 91 for a directory service is built on the storage device 71. The directory database 91 may include user data 91a and group data 91b. The user data 91a may include registration information data having authentication information (for example, the user ID and the password) and user information (for example, contact information such as a telephone number, a facsimile transmission number, or an electronic mail address and other attribute information). The group data 91b may include registration information data having the authentication information (for example, a group ID, user IDs of users belonging to the group) and group information (for example, contact information, a manager, and other attribute information).

The network interface 72 is connected to the computer network 2 in a wired or wireless manner, and performs data communications with other devices (for example, the user manager server device 3) connected to the network 2.

The processor 73 includes a CPU, a ROM, and a RAM, and implements various processing units by loading a program stored in the ROM or the storage device 71 into the RAM and causing the CPU to execute the program. For example, the processor 73 may implement a network communication unit 81 and a directory service processing unit 82.

The network communication unit 81 controls the network interface 72 to perform data communications with the devices on the network 2 using various kinds of communication protocols. For example, the network communication unit 81 may receive the user authentication request, and transmit the authentication result and the user information.

The directory service processing unit 82 manages the domain user and the domain group. The directory service processing unit 82 performs registration and deletion of the domain user and the domain group, user authentication, and provision of the user information on the domain user and the group information on the domain group. The user authentication may include lightweight directory access protocol (LDAP) authentication, Kerberos authentication, or the like. When a directory service is Active Directory, the directory service processing unit 82 may operate as a domain controller.

Figure 6:
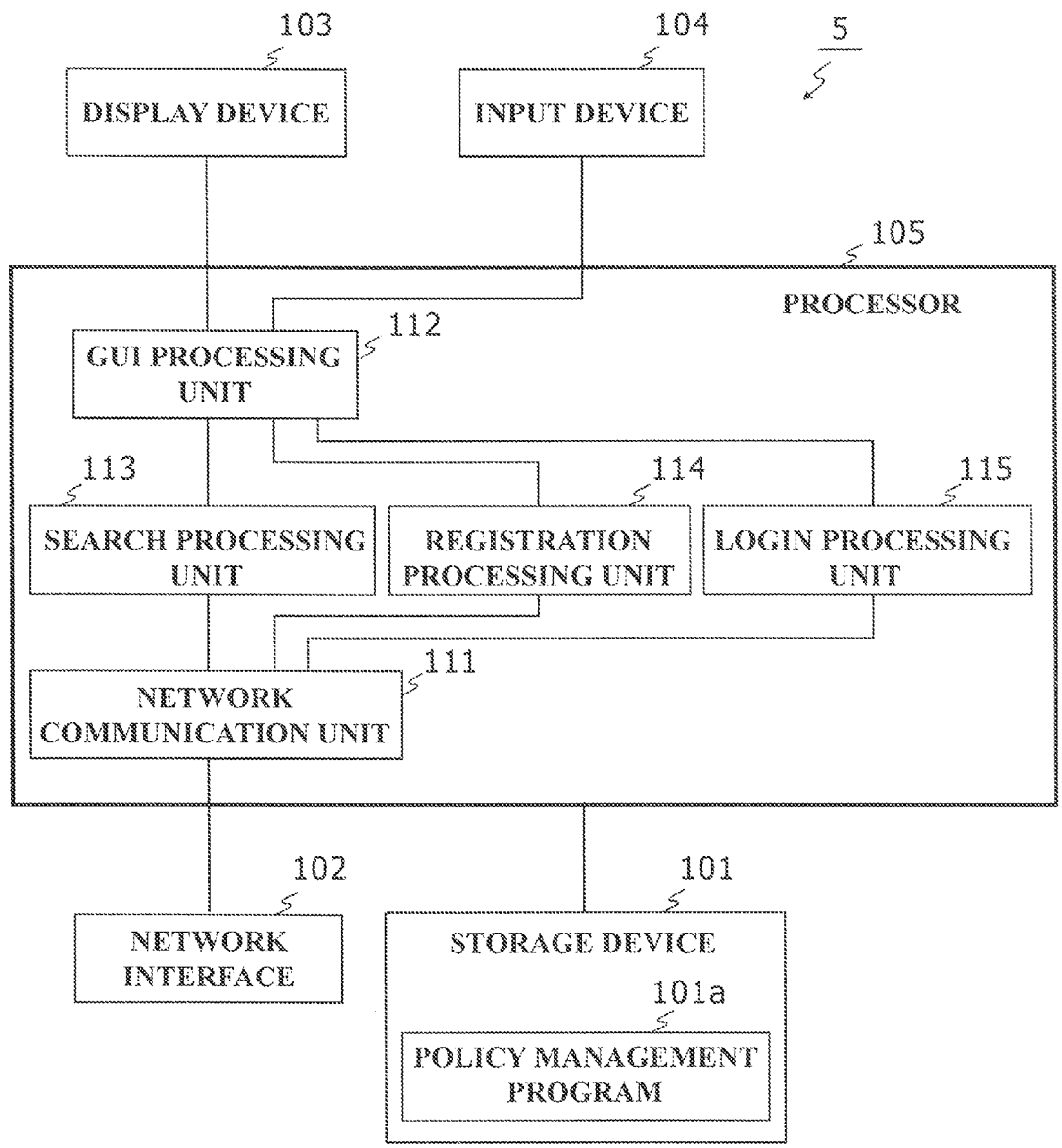
FIG. 6 is a block diagram illustrating a configuration of a terminal device.

FIG. 6 is a block diagram illustrating a configuration of the terminal device 5 (example of the authorization information registration device) of FIG. 1. The terminal device 5 includes a storage device 101, a network interface 102, a display device 103, an input device 104, and a processor 105. The terminal device 5 may be, for example, a personal computer in which a predetermined program is installed.

The storage device 101 stores a program and data. The storage device 101 may include a nonvolatile semiconductor memory, a hard disk drive, or the like. The storage device 101 stores a policy management program 101*a*.

The network interface 102 is connected to the computer network 2 in a wired and/or wireless manner, and performs data communications with other devices (for example, the user manager server device 3 and the directory server device 4) connected to the network 2.

The display device 103 (for example, a liquid crystal display) displays various kinds of information to the user. When the registration of the authorization information is executed, the display device 103 displays a tree, a list of the authorization information, and the like. The input device 104 (for example, a keyboard and/or a mouse) receives a user operation, and outputs an electrical signal corresponding to the user operation to the processor 105.

The processor 105 includes a CPU, a ROM, and a RAM, and implements various processing units by loading a program stored in the ROM or the storage device 101 into the RAM and causing the CPU to execute the program. The processor 105, executing the policy management program 101*a*, may implement a network communication unit 111, a graphical user interface (GUI) processing unit 112, a search processing unit 113, a registration processing unit 114, and a login processing unit 115.

The network communication unit 111 controls the network interface 102 to perform data communications with the devices on the network 2 using various communication protocols.

The GUI processing unit 112 causes the display device 103 to display various kinds of GUI screens, and detects user operation(s) input to the input device 104. The GUI processing unit 112 causes the display device 103 to display the tree that presents superior-subordinate relationships among the domain and/or the local groups and/or users and to display the list of authorization policies including an authorization setting value regarding the function. The tree and the list are displayed based on the information collected from the user-manager server device 3 and the directory server device 4.

The search processing unit 113 causes the network communication unit 111 and the network interface 102 to search the directory server device 4 via the network 2 for the domain group and/or the domain user and acquire list data based on registration information data on the domain groups and/or domain users. The list data may include domain group names, domain user names, domain group IDs and/or domain user IDs. The search processing unit 113 causes the network communication unit 111 and the network interface 102 to search the user-manager server device 3 via the network 2 for the local group and/or the local user and acquire list data based on registration information data on local groups and/or local users. The list data includes local group names, local user names, local group IDs and/or local user IDs).

The registration processing unit 114 determines the authorization information on domain groups and/or domain users in the list data acquired by the search processing unit 113. The registration processing unit 114 causes the network communication unit 111 and the network interface 102 to register the authorization information on domain groups and/or domain users to the user-manager server device 3 via the network 2 in association with the domain group and/or the domain user as authorization information data on domain groups and/or domain users. The registration processing unit 114 determines the authorization information on local groups and local users in the list data acquired by the search processing unit 113. The registration processing unit 114 registers the authorization information on local groups and/or local users to the user-manager server device 3 via the network 2 in association with the local group and/or the local user as authorization information data on local groups and/or local users. Further, the registration processing unit 114 sets the authorization information data on domain groups and/or domain users by associating the authorization policy selected from the list of the authorization policies displayed on the display device 103 with the domain group and/or the domain user selected from the tree displayed on the display device 103.

The login processing unit 115 causes the directory server device 4 to perform the user authentication on the user of the terminal device 5. The login processing unit 115 permits only an administrator user who has succeeded in the user authentication on the user of the terminal device 5 to execute registration process for the authorization information or the like.

Figure 7:
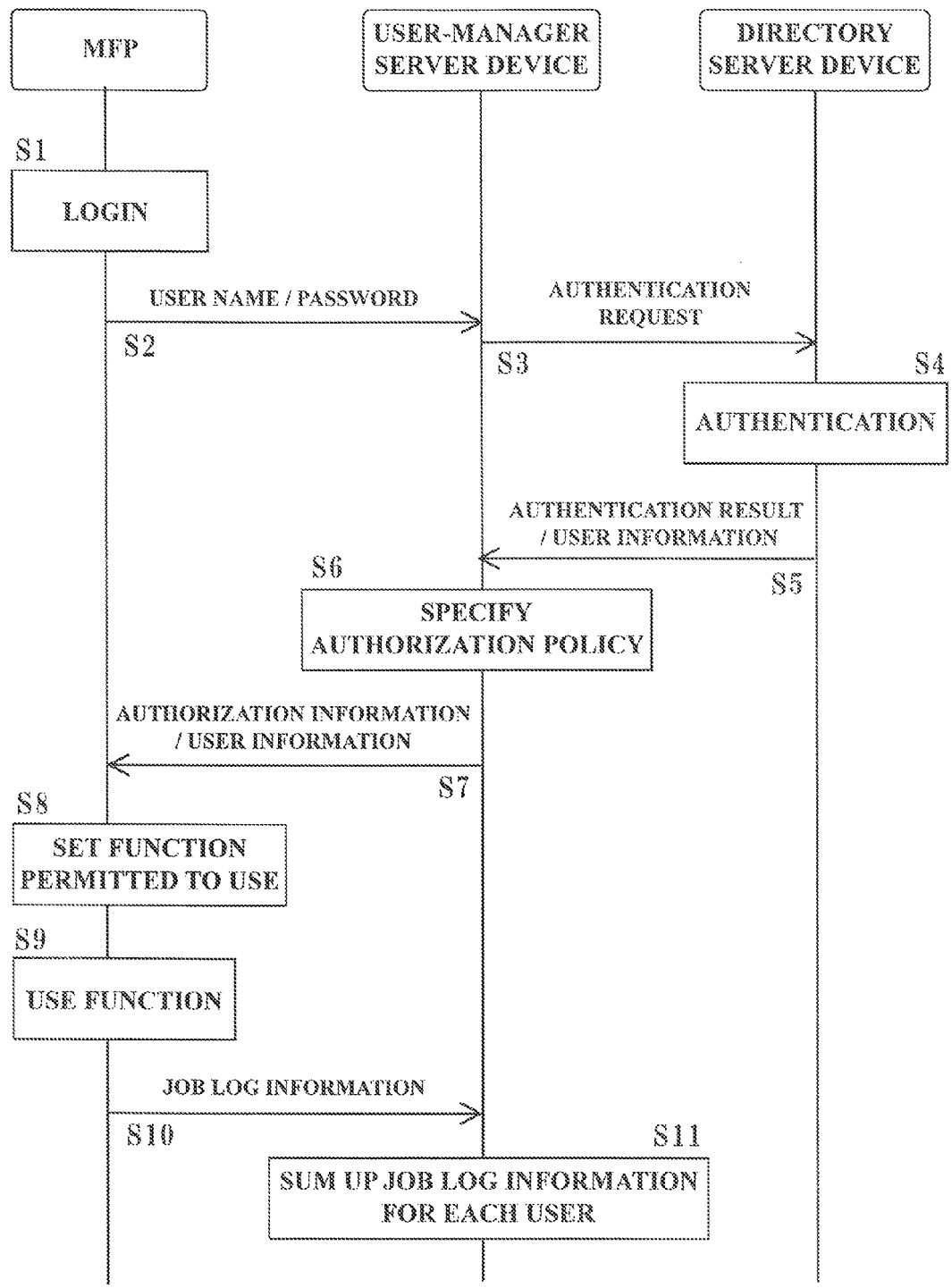
FIG. 7 is a sequence diagram illustrating an operation of devices when a user logs in to the MFP in the image forming system of FIG. 1.

FIG. 7 is a sequence diagram illustrating the operation of each of the apparatuses and the devices when the user logs in to the MFP 1A in the image forming system illustrated in FIG. 1. Each of the apparatuses and the devices illustrated in FIG. 7 would operate in a same or similar matter when a user logs in to the MFP 1B.

The operation panel 21 of the MFP 1A detects an operation of inputting a user name (the user ID) and a password performed by the user (S1). The control unit 33 causes the network communication unit 32 and the network interface 23 to transmit the user name and/or the password to the user-manager server device 3 (S2).

On the user-manager server device 3, the user authentication processing unit 62 causes the network communication unit 61 and the network interface 42 to receive the user name and/or the password and transmit the user name, the password, and an authentication request to the directory server device 4 using a predetermined protocol (for example, LDAP) (S3).

On the directory server device 4, the directory service processing unit 82 causes the network communication unit 81 and the network interface 72 to receive the user name, the password, and the authentication request by the predetermined protocol, and references the directory database 91 to determine whether or not the user name and/or the password belongs to a valid user (S4).

The directory service processing unit 82 causes the network communication unit 81 and the network interface 72 to transmit a determination (authentication) result (and, if the authentication is successful, the user information on the user), to the user-manager server device 3 as a response to the authentication request (S5).

On the user-manager server device 3, the user authentication processing unit 62 causes the network communication unit 61 and the network interface 42 to receive the authentication result as the response to the authentication request. If the authentication has been successful, the user authentication processing unit 62 receives the user information, and the authorization processing unit 63 references the authorization policy data 51 to specify the authorization information on the user (authorization policy to be applied to the user) (S6). The authorization processing unit 63 causes the network communication unit 61 and the network interface 42 to transmit a response indicating the successful authentication to the MFP 1A (and/or MFP 1B) in addition to the authorization information and the user information (S7).

On the MFP 1A, the control unit 33 causes the network communication unit 32 and the network interface 23 to receive the authorization information and the user information, and provides the authorization information to the determination unit 34 (S8). Based on the authorization information, the determination unit 34 sets, in the RAM, data indicating whether or not the user is permitted to use each of the functions that the MFP 1A provides.

The user is then permitted to use the MFP 1A with the functions limited according to the authorization information (S9). On the MFP 1A, the control unit 33 references the data set by the determination unit 34 to allow only a job that uses the functions permitted to the user, and executes the allowed job.

It should be noted that, if the user authentication has failed, only a response indicating an authentication failure is transmitted from the user-manager server device 3 to the MFP 1A. Upon reception of the response indicating the authentication failure, the MFP 1A may display a message indicating the authentication failure onto the operation panel 21, and prohibit the user from using the MFP 1A.

On the MFP 1A, the control unit 33 generates job log information each time a job is executed for a logged-in user who has succeeded in the user authentication. The control unit 33 causes the network communication unit 32 and the network interface 23 to transmit the job log information to the user-manager server device 3 (S10).

The job tracking processing unit 64 causes the network communication unit 61 and the network interface 42 to receive the job log information, and stores the job log information into the RAM or the storage device 41. The job tracking processing unit 64 sums up the job log information on each of the domain users and the local users automatically or in response to requests made by the host device (not illustrated), the MFPs 1A and 1B, and the like (S11). For example, when the logged-in user performs a designated operation to the MFP 1A, the control unit 33 of the MFP 1A transmits a request to sum up the job log information to the user-manager server device 3 with the user ID. Upon reception of the request, the job tracking processing unit 64 of the user-manager server device 3 sums up the job log information corresponding to the logged-in user having the user ID received with the request as the user job history, and transmits the summed up job log information to the MFP 1A as a response to the request. Upon reception of the job log information, the control unit 33 of the MFP 1A causes the job log information to be displayed on the operation panel 21.

According to the above-described embodiment, without affecting the registration information data including the authentication information on domain groups and domain users in the directory server device, a user-manager server device provided separately from the directory server device may create a new group (the local group) including the domain user in the directory server device and set the authorization information on the new group. The authorization information may be centrally managed and the authorization information may be flexibly set. Further, it is possible to collectively manage the user job histories for all the users who use image forming apparatuses via the network.

Figure 8:
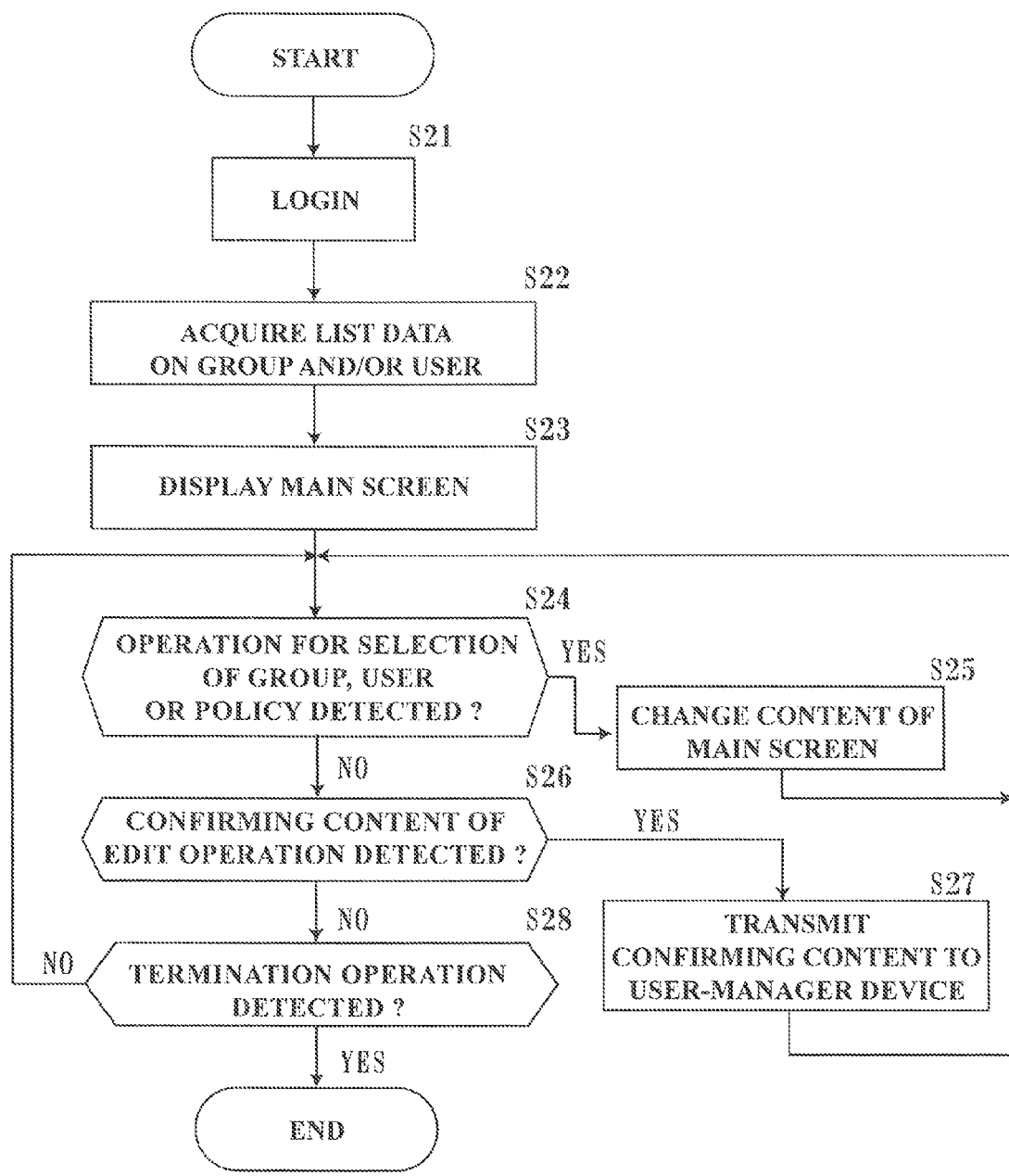
FIG. 8 is a flowchart illustrating an operation of the terminal device when authorization information is registered to the user-manager server device in the image forming system of FIG. 1.

FIG. 8 is a flowchart illustrating an operation of the terminal device 5 (an example of the authorization information registration device) when the authorization information is registered to the user-manager server device 3 in the image forming system illustrated in FIG. 1.

When the policy management program 101a is executed, the login processing unit 115 executes login process (S21). The login processing unit 115 causes the GUI processing unit 112 to display a dialog box including input fields for the user ID (or user name) and the password in the display device 103, and prompts inputs of the user ID (or user name) and the password. When the login processing unit 115 causes the GUI processing unit 112 to detect the inputs of the user ID (or user name) and the password to the input device 104, the login processing unit 115 causes the network communication unit 111 and the network interface 102 to transmit the user authentication request to the directory server device 4 with the user ID (or user name) and the password and receive a result of the user authentication from the directory server device 4. If the user authentication is successful as the administrator user, the login processing unit 115 permits execution of the following process. If the user authentication has failed as the administrator user, the login processing unit 115 terminates the process without permitting the execution of the following process.

If the user authentication is successful as the administrator user, the search processing unit 113 accesses the directory server device 4 to acquire the list data on the domain groups and/or the domain users, and accesses the user-manager server device 3 to acquire the list data on the local groups and/or the local users and the authorization policy data 51 that are currently set (S22). The search processing unit 113 transmits requests for those list data and the authorization policy data 51 to the directory server device 4 and the user-manager server device 3 via the network 2. Upon reception of the requests, the directory service processing unit 82 of the directory server device 4 transmits the list data on the domain groups and/or the domain users, and the authorization processing unit 63 of the user-manager server device 3 transmits the list data on the local groups and/or the local users and the authorization policy data 51, to the search processing unit 113.

Figure 9:
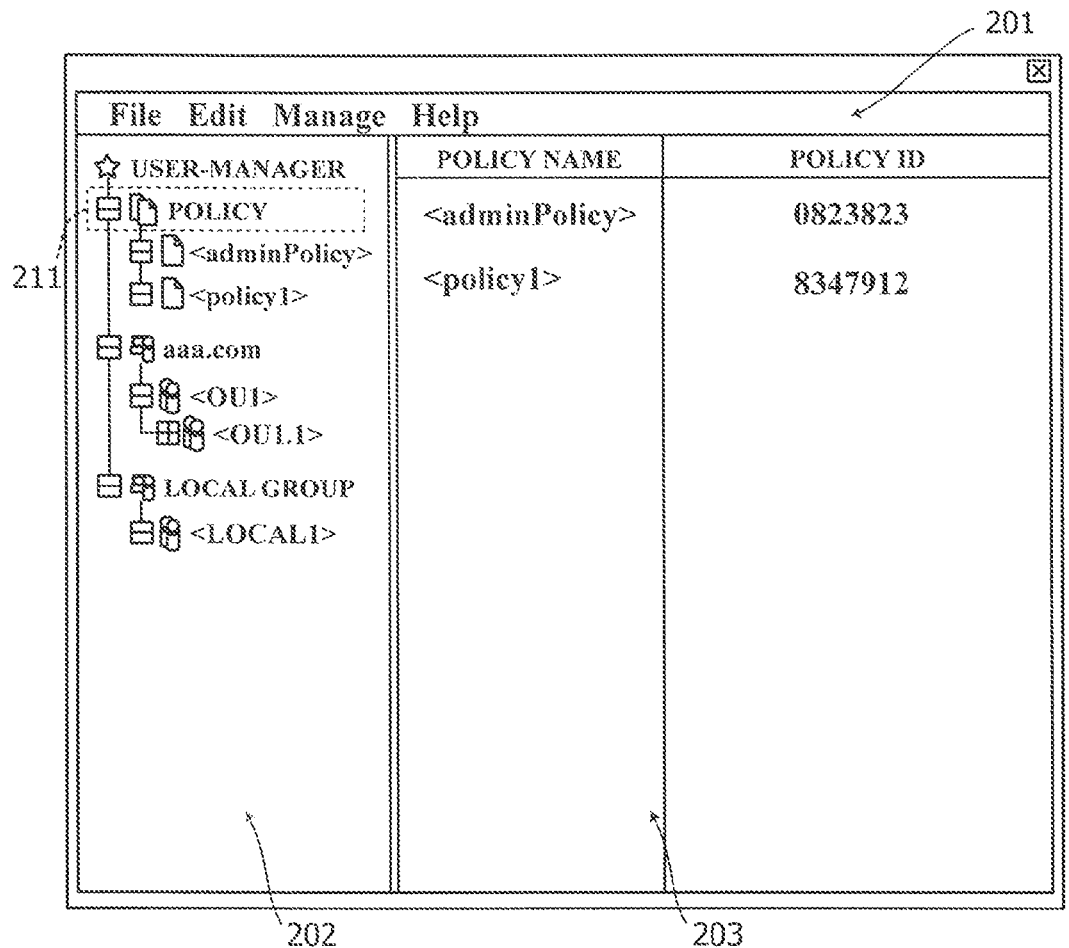
FIG. 9 is a diagram illustrating an example of a main screen displayed on the terminal device.

Based on those list data and the authorization policy data 51 acquired in Step S22, the GUI processing unit 112 causes the display device 103 to display a main screen (S23). FIG. 9 is a diagram illustrating an example of the main screen displayed on the terminal device 5 of FIG. 1. The main screen includes three display areas 201, 202 and 203. A main menu is displayed in the display area 201. The main menu of the main screen includes items of "File", "Edit", "Manage," and "Help". Each of the items is formed of a pull-down menu, and an item for a desired operation can be selected from the pull-down menu. For example, the pull-down menu for the item "Manage" may include items for addition and deletion of the authorization policy, the local group, and the local user. When the items included in the item "Manage" are selected, the addition and deletion of the authorization policy, the local group, and the local user are respectively executed. Displayed in the display area 202 are the list of the authorization policies, the tree within the domain group ("aaa.com" in the example of FIG. 9), and the tree within the local group. Displayed in the display area 203 are the list of the authorization policies and a current setting state regarding the item selected in those trees by a cursor 211. In addition, displayed in the display area 203 is a GUI input section including a selection menu and an input field for changing the setting state for the selected item. In FIG. 9, the title of the list of the authorization policies is selected by the cursor 211, and hence the list of the registered authorization policies is displayed in the display area 203.

After displaying the main screen, when the user operates the input device 104 to select another item from the list of the authorization policies and the trees, the GUI processing unit 112 detects the operation for selection (S24), and changes display contents of the display area 203 corresponding to the selected another item (S25).

Figure 10:
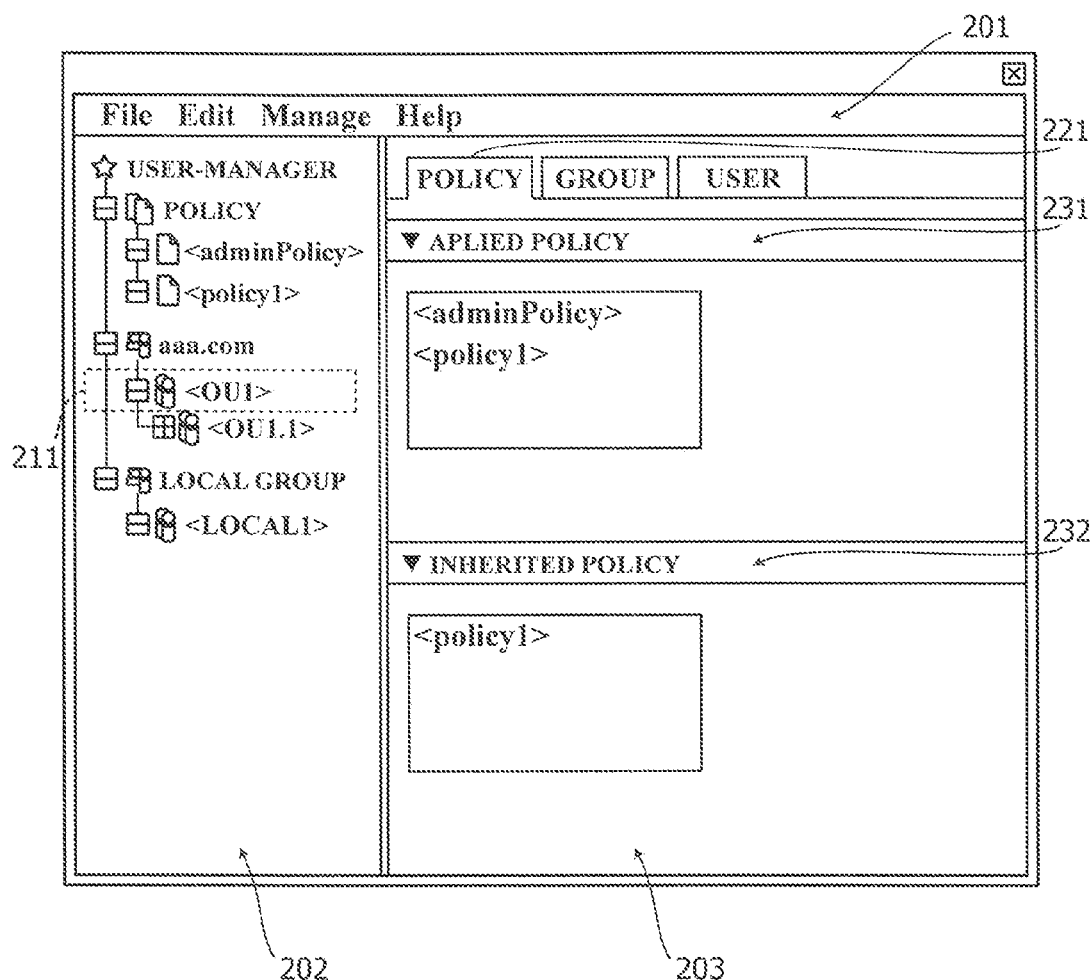
FIG. 10 is a diagram illustrating an example of display contents of a display area on the main screen when a group <OU1> is selected from a tree of FIG. 9.
Figure 11:
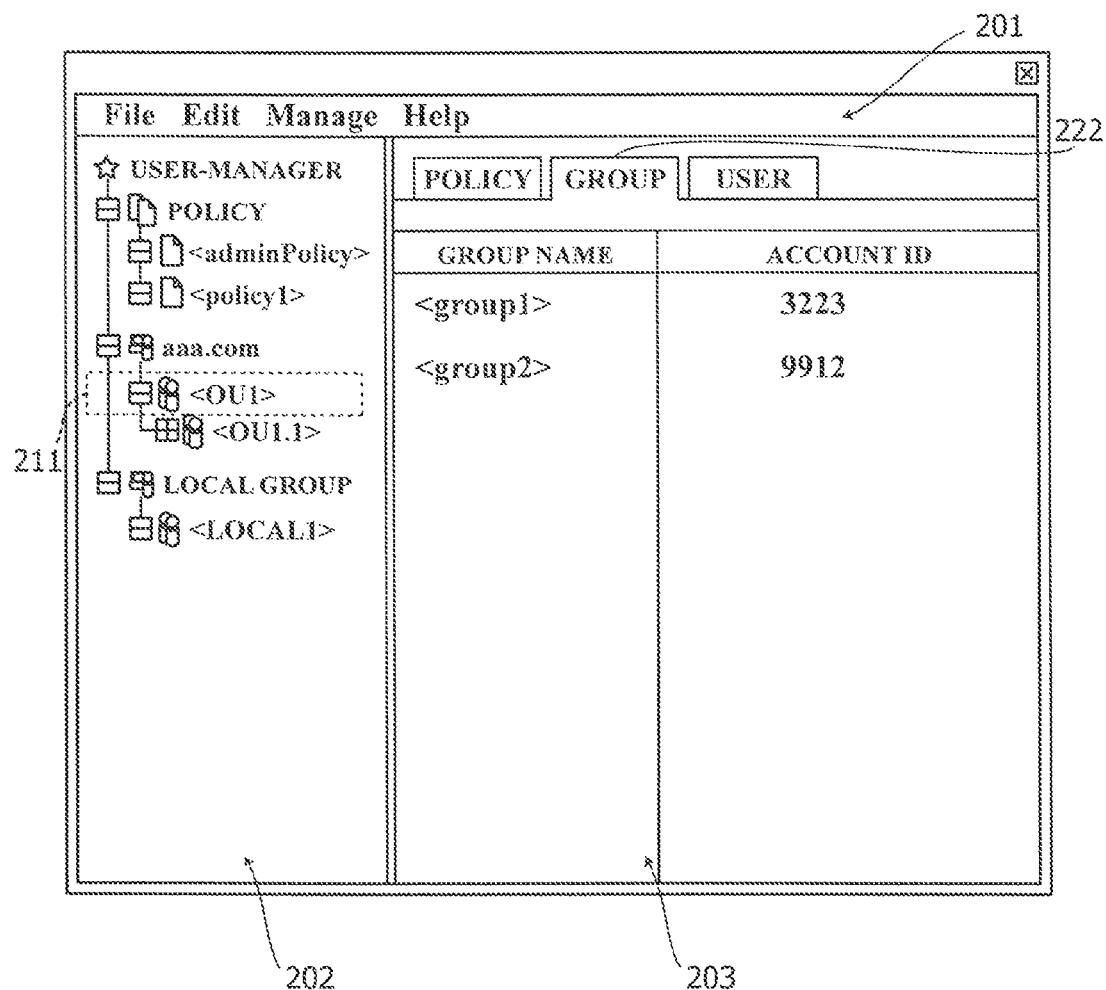
FIG. 11 is a diagram illustrating another example of display contents of a display area on the main screen when the group <OU1> is selected from the tree of FIG. 9.
Figure 12:
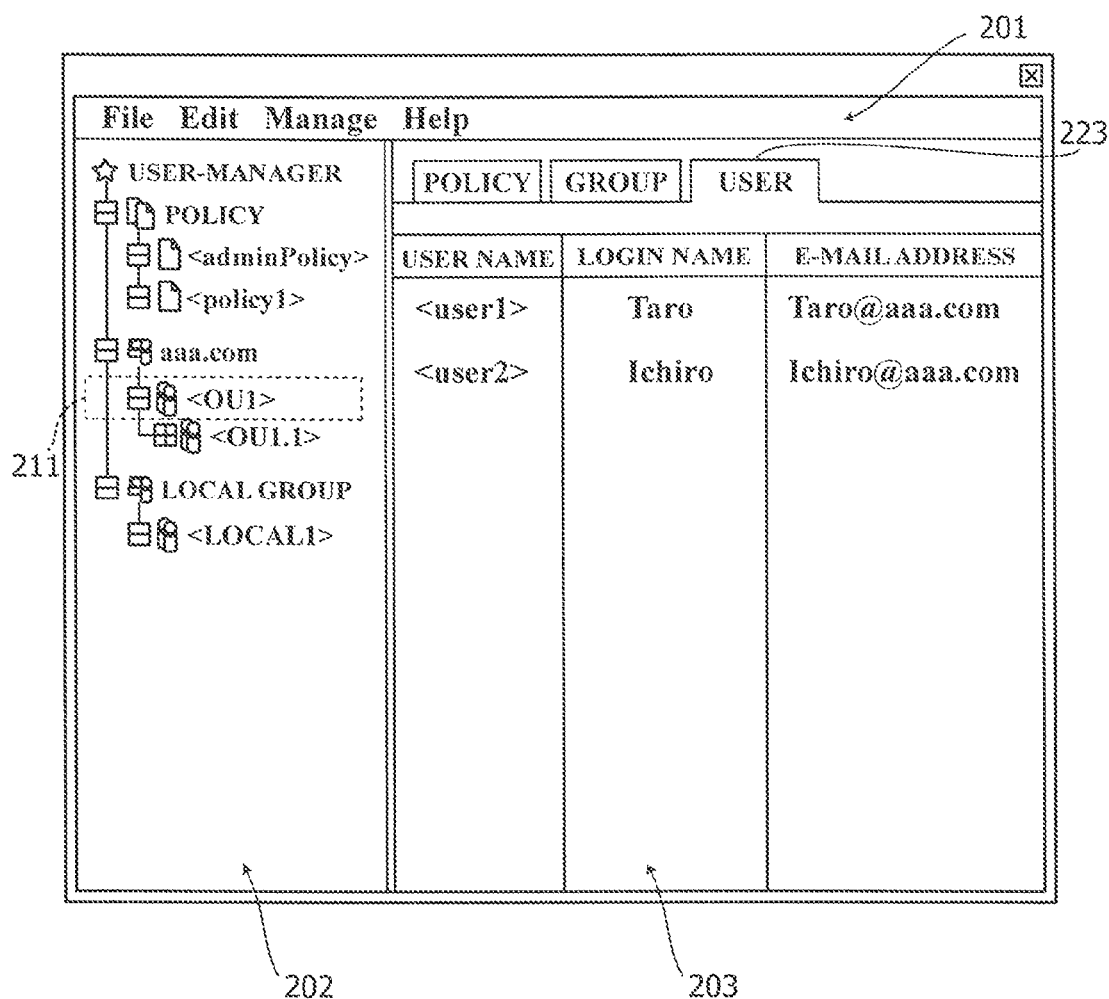
FIG. 12 is a diagram illustrating another example of display contents of a display area on the main screen when the group <OU1> is selected from the tree of FIG. 9.

FIG. 10, FIG. 11, and FIG. 12 are diagrams illustrating examples of the display contents of the display area 203 when a group <OU1> is selected from the tree of FIG. 9. When the group <OU1> is selected from the tree, a policy tab 221, a group tab 222, and a user tab 223 are displayed on the display area 203. As illustrated in FIG. 10, when the policy tab 221 is selected, a list 231 of the authorization policies applied to the group and a list 232 of the authorization policies inherited from an upper-level group than the group <OU1> are displayed based on the current authorization settings acquired in Step S22. As illustrated in FIG. 11, when the group tab 222 is selected, a list of lower-level groups (sub groups) than the group <OU1> is displayed based on the current authorization settings acquired in Step S22. As illustrated in FIG. 12, when the user tab 223 is selected, a list of users belonging to the group <OU1> is displayed based on the current authorization settings acquired in Step S22.

When an edit operation including the addition, change, and deletion of the authorization policy and the addition, change, and deletion of an authorization policy assignment is detected based on the user's input to the main menu 201 or the GUI input section of the display area 203, the GUI processing unit 112 changes the display contents of the main screen based on the edit operation. When a confirming operation for confirming contents of the edit operation is detected (S26), the registration processing unit 114 transmits, to the user-manager server device 3, a request to execute any one of the addition, change, and deletion of the authorization policy and the addition, change, and deletion of the authorization policy assignment that is specified based on the edit operation (S27). Upon reception of the request, the user-manager server device 3 updates the authorization policy data 51 by the request. On the user-manager server device 3, the authorization processing unit 63 receives the request and edits the authorization policy data 51. When the addition or change of the authorization policy or the authorization policy assignment, contents of a new authorization policy or new authorization policy assignment are transmitted with the request, while on the user-manager server device 3, the authorization policy data 51 is updated based on the contents.

After displaying the main screen, when the GUI processing unit 112 detects a termination operation (S28), the execution of the policy management program 101a is terminated.

The registration of the authorization policy assignment and the authorization policy to the group or the user are described in the following.

Figure 13:
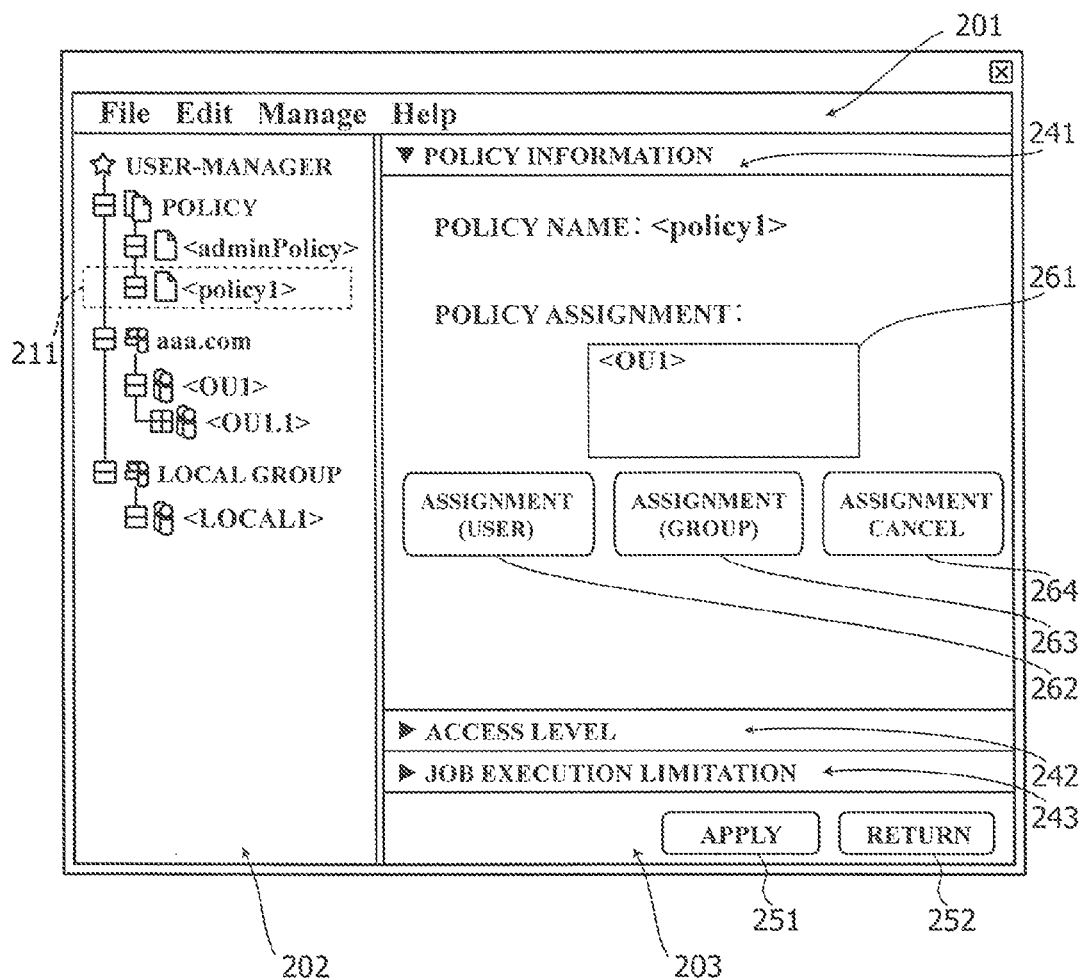
FIG. 13 is a diagram illustrating an example of an input screen displayed when an authorization policy assignment to a group or user is registered on the terminal device.

(a) Registration of the Authorization Policy Assignment to the Group or the User FIG. 13 is a diagram illustrating an example of an input screen displayed when the authorization policy assignment to the group or the user is registered on the terminal device 5 of FIG. 1. The authorization policy to be assigned is selected by the cursor 211 from the list of authorization policies in the display area 202. Upon detection of the operation for selection, the GUI processing unit 112 displays three expandable panels 241, 242, and 243, an apply button 251, and a return button 252 in the display area 203.

In a case of the registration of the authorization policy assignment to the group, a panel 241 is opened. Upon detection of the operation for selection, as illustrated in FIG. 13, the GUI processing unit 112 displays in the panel 241 information regarding the selected authorization policy (<policy1> in the example of FIG. 13) including a policy name, a list 261 of groups and users to which the authorization policy is to be assigned, policy assignment buttons 262 and 263, and a policy assignment cancellation button 264.

When the policy assignment button 262 is depressed, the GUI processing unit 112 displays a list of users (domain users and local users). Upon detection of an operation for selection of a user to which the authorization policy is to be assigned, the GUI processing unit 112 adds the selected user to the list 261. When the policy assignment button 263 is depressed, the GUI processing unit 112 displays a list of groups (domain groups and local groups). Upon detection of an operation for selection of a group to which the authorization policy is to be assigned, the GUI processing unit 112 adds the selected group to the list 261. When the policy assignment cancellation button 264 is depressed, the GUI processing unit 112 deletes, from the list 261, the selected group and/or the selected user from the list 261.

When the apply button 251 is depressed and the GUI processing unit 112 detects the operation for depression, the registration processing unit 114 transmits a request to change the assignment of the authorization policy to the user-manager server device 3 with the list of the groups and/or the users included in the list 261. The depression of the apply button 251 corresponds to a confirming operation.

(b) Registration of the Authorization Policy

Figure 14:
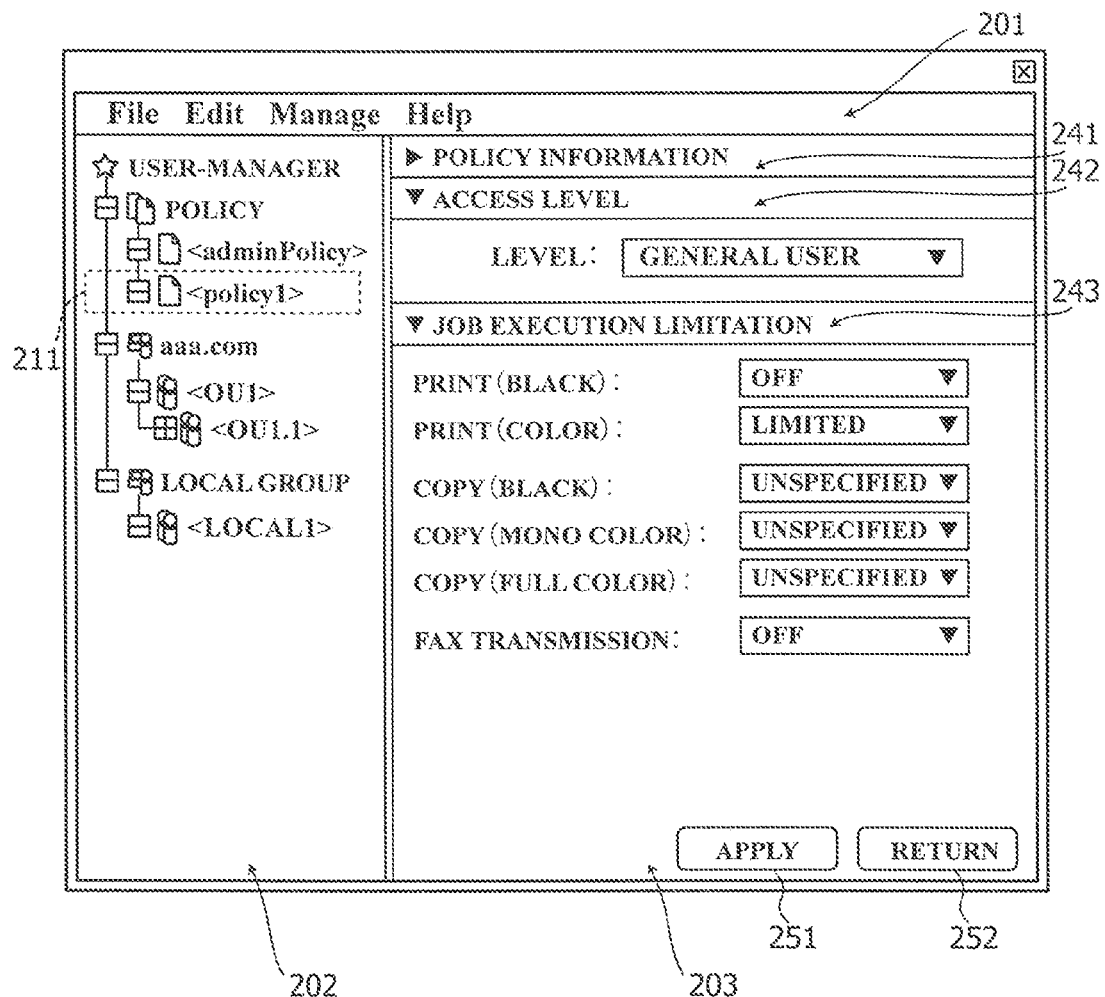
FIG. 14 is a diagram illustrating an example of an input screen displayed when the authorization policy is registered on the terminal device.

FIG. 14 is a diagram illustrating an example of an input screen displayed when the authorization policy is registered on the terminal device 5 of FIG. 1.

The authorization policy to be assigned is selected by the cursor 211 from the list of authorization policies in the display area 202. Upon detection of the operation for selection, the GUI processing unit 112 displays the three expandable panels 241, 242, and 243, the apply button 251, and the return button 252 in the display area 203.

In a case of the registration of the authorization policy, the panels 242 and 243 are opened. Upon detection of the operation for selection, as illustrated in FIG. 14, the GUI processing unit 112 displays in the panel 242 an access level (general user or administrator user) regarding the selected authorization policy (<policy1> in the example of FIG. 14). The access level indicates an access right level of the logged-in user to the MFPs 1A and 1B in such a manner that a current setting value of the access level can be changed by operation of a combo box and/or a pull-down menu. The GUI processing unit 112 displays a job execution limitation in the panel 243. The job execution limitation indicates the limitation of the function that MFPs 1A and 1B include, in such a manner that the current setting value of the job execution limitation can be changed by operation of a combo box and/or a pull-down menu. In the example of FIG. 14, one of the current setting values "off", "limited", and "unspecified" is set for each of the job execution limitations. When the current setting value "unspecified" is set, the current setting value set for the same job execution limitation regarding the upper-level group is inherited.

When the apply button 251 is depressed and the GUI processing unit 112 detects the operation, the registration processing unit 114 transmits a request to change the assignment of the authorization policy to the user-manager server device 3 with the current setting values set in the panels 242 and 243. The depression of the apply button 251 corresponds to a confirming operation.

According to the above-described embodiment, an authorization information registration device automatically collects the groups and the users for which the authorization information data is to be set, and hence it is possible to register the authorization information data to the user-manager server device 3 more easily.

The present disclosure includes various other embodiments. For example, other designs can be used in which the above-described components are each performed.

In the image forming system according to the present disclosure, an ID card (for example, an IC card) assigned to a user may be used instead of the user inputting his or her user name into the MFP 1A during user login.

An IC card reader may be connected to the MFP 1A, and when the ID card is brought to the IC card reader, the control unit 33 may use the IC card reader to read a card ID from the ID card. The control unit 33 may then transmit the card ID to the user-manager server device 3 with the password input in the same manner as in the above-described embodiment.

In the storage device 41 of the user-manager server device 3, conversion data is stored in which the card ID is associated with a user ID of the user to which the ID card is assigned. Upon reception of the card ID and the password, the user authentication processing unit 62 references the conversion data to specify the user ID corresponding to the card ID, and causes the directory server device 4 to perform the user authentication based on the specified user ID and the received password.

While the IC card is used as the ID card in the above described example, a card including a recording medium of another format (for example, a magnetic card) may also or alternatively be used. In this case, a reader that can read the card ID from the card of the another format is used instead of the IC card reader. Further, biometric information such as a fingerprint may be used instead of the ID card. In this case, a reader that can acquire the biometric information from the user is used instead of the IC card reader, and a characteristic of a feature obtained from the biometric information is used as a biometric ID.

According to the above-description, the storage device 41 of the user-manager server device 3 includes the conversion data including an association between the card ID and the user ID of the user to which the ID card is assigned. The user authentication processing unit 62 receives the card ID and the password of the ID card from each of the MFPs 1A and 1B, specifies the user ID of the logged-in user from the received card ID with the conversion data, and uses the user ID to perform the user authentication.

Accordingly, the card ID is managed on the user-manager server device 3, and hence it is not necessary to manage the card ID in the directory server device 4. In a system in which the directory service has already been operating, it is possible to add a login system using the ID card easily.

In the above-described embodiment, the local users and the domain users coexist in the local group, but the local group may be formed of only local users or the local group may be formed of only domain users, or some combination thereof.

In the above-described embodiment, the user-manager server device 3 and the directory server device 4 may be configured to perform data communications via another network different from the network 2 by connecting the user-manager server device 3 to the another network instead of being connected to the network 2.

In the above-described embodiment, the MFPs 1A and 1B are used as the image forming apparatuses, but a printer, a copier, and the like may additionally or alternatively be used. Further, while the illustrated image forming system includes two image forming apparatuses, the image forming system may alternatively include less than two or more than two image forming apparatuses.

The access right level to the MFP may be included in the authorization information. For example, one of the administrator and the general user is set as the access right level. In a case of the administrator, it is possible to use a function such as maintenance, which cannot be used by the general user.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system, comprising:
    an image forming apparatus configured to connect to a network;
    a directory server device configured to connect to the network and to include registration information data on at least one of a domain group and a domain user;
    an authorization information registration device configured to (i) acquire list data based on the registration information data on the at least one domain group and domain user from the directory server device, (ii) determine authorization information on the at least one domain group and domain user within the list data, and (iii) register the determined authorization information to a user-manager server device in association with at least one of the domain group and domain user as authorization information data; and
    the user-manager server device configured to connect to the network and to transmit, to the image forming apparatus, user-authorization information corresponding to a logged-in user to the image forming apparatus based on the authorization information data on the at least one of the domain group and the domain user, wherein
    the image forming apparatus is further configured to transmit authentication information corresponding to the logged-in user to the user-manager server device;
    the user-manager server device is further configured to transmit the received authentication information to the directory server device; and
    the directory server device is further configured to perform authentication of the logged-in user based on the authentication information and the registration information data on the domain user, and transmit an authentication result and user information corresponding to the logged-in user to the user-manager server device as the list data.

2. The image forming system according to claim 1, wherein the user-manager server device includes second registration information data on at least one of a local group and local user that is separate from the registration information on the at least one domain group and domain user on the directory server device.

3. The image forming system according to claim 2, wherein the authorization information registration device is further configured to (i) acquire second list data based on the second registration information data from the user-manager server device, (ii) determine the authorization information on the at least one local group and/or the local user within the second list data, and (iii) register the determined authorization information to the user-manager server device in association with the at least one local group and local user as the authorization information data.

4. The image forming system according to claim 3, wherein the user-manager server device is further configured to transmit, (i) when the logged-in user belongs to the local group, the authorization information on the at least one local group and local user to the image forming apparatus as the user-authorization information, and (ii) when the logged-in user does not belong to the local group, the authorization information on the at least one of the domain group and domain user to the image forming apparatus as the user-authorization information.

5. The image forming system according to claim 3, wherein the user-manager server device is further configured to generate, when there is a plurality of the authorization information corresponding to the logged-in user, the user-authorization information by combining the plurality of the authorization information.

6. The image forming system according to claim 3, wherein, when the logged-in user belongs to the local group, the user-manager server device is further configured to generate, (i) when authorization information on the domain user for the logged-in user exists, the user-authorization information based on common authorization information in both the authorization information on the domain user and the authorization information on the local group, and (ii) when authorization information on the domain user for the logged-in user does not exist, the user-authorization information based on the authorization information on the local group.

7. The image forming system according to claim 6, wherein the user-manager server device is further configured to generate, when the logged-in user belongs to the local group and is the local user, the user-authorization information based on authorization information common in both the authorization information on the local user and the authorization information on the local group.

8. The image forming system according to claim 6, wherein the user-manager server device is further configured to generate, when the logged-in user belongs to the local group and also belongs to the domain group, the user-authorization information based on authorization information common in both the authorization information on the local group and the authorization information on the domain group.

9. The image forming system according to claim 2, wherein the authorization information registration device is further configured to display a tree indicating superior-subordinate relationships among the domain groups, domain users, local groups, and local users, and a list of available functions that the image forming apparatus provides, and sets authorization information data responsive to a selection made from the list in association with one of the domain groups, domain users, local groups, and local users selected from the tree.

10. The image forming system according to claim 9, wherein the authorization information data includes an access right level of the logged-in user to the image forming apparatus.

11. The image forming system according to claim 1, wherein:
the image forming apparatus is further configured to generate job log information when executing a job for the logged-in user, and to transmit the job log information to the user-manager server device in association with the logged-in user; and
the user-manager server device is further configured to receive the job log information from the image forming apparatus, and sum up the job log information as a user job history for each domain user.

12. The image forming system according to claim 11, wherein the user-manager server device includes the registration information data on the local user separately from the registration information data on the domain user registered on the directory server device, and is further configured to separately sum up the job log information as the user job history for each of the domain user and the local user.

13. An image forming apparatus, which is connected to a network, comprising:
an ID card reader;
an input device configured to receive an input of authentication information that includes a card ID of an ID card corresponding to a logged-in user;
a determination unit configured to specify functions that are permitted for use by the logged-in user among possible functions that the image forming apparatus provides based on authorization information, and to store data indicating whether or not each function is permitted for use by the logged-in user; and
a control unit configured to cause the logged-in user to use only the permitted functions permitted for use based on the data, wherein, the authentication information corresponding to the logged-in user is transmitted via a user-manager server device, which includes conversion data including an association between the card ID of the ID card and a user ID, specifies the user ID of the logged-in user from the authentication information with the conversion data, and is connected to the network from the image forming apparatus to a directory server device connected to the network, user information corresponding to the logged-in user is transmitted to the user-manager server device from the directory server device if the authentication information is determined to be valid by the directory server device, and user-authorization information corresponding to the user information is specified and transmitted to the image forming apparatus from the user-manager server device, wherein the user-authorization information includes authorization information on at least one of a local group and local user registered on the user-manager server device that is separate from authorization information on at least one of a domain croup and domain user registered on the directory server device.

14. An image forming method, comprising:
transmitting, via an image forming apparatus connected to a network, authentication information corresponding to a logged-in user to a user-manager server device connected to the network;
transmitting, via the user-manager server device, the authentication information received from the image forming apparatus and an authentication request to a directory server device connected to the network;
determining, via the directory server device, whether or not the authentication information received from the user-manager server device is valid, and if the authentication information is valid, transmitting user information corresponding to the logged-in user to the user-manager server device as a response to the authentication request;
acquiring, via an authorization information registration device connected to the network, list data on at least one of a domain group and a domain user from the directory server device, determining authorization information on the at least one of the domain group and domain user within the list data, and registering the determined authorization information to the user-manager server device;
specifying, via the user-manager server device, user-authorization information based on the user information received from the directory server device, and transmitting the user-authorization information to the image forming apparatus; and
setting, via the image forming apparatus, data indicating whether or not the logged-in user is permitted to use a function that the image forming apparatus provides based on the authorization information received from the user-manager server device, and referencing the set data to allow only those jobs that use permitted functions to be executed.

15. The image forming method according to claim 14, further comprising (i)
acquiring, by the authorization information registration device, second list data on at least one of a local group and local user from the user-manager server device, (ii) determining second authorization information on the at least one local group and local user within the second list data, and (iii) registering the determined second authorization information to the user-manager server device.

16. The image forming method according to claim 14, further comprising:

providing an ID card reader associated with the image forming apparatus;

receiving a card ID associated with an ID card from the ID card reader, and transmitting the card ID as the authentication information to the user-manager server device;

the user-manager server device receiving the authentication information, specifying a user ID of the logged-in user from the authentication information and conversation data that associates card IDs with user IDs, and performing a user authentication with the user ID.

\* \* \* \* \*